L. R. FAUGHT.
Horse-Powers.
No. 143,974. Patented Oct. 28, 1873.
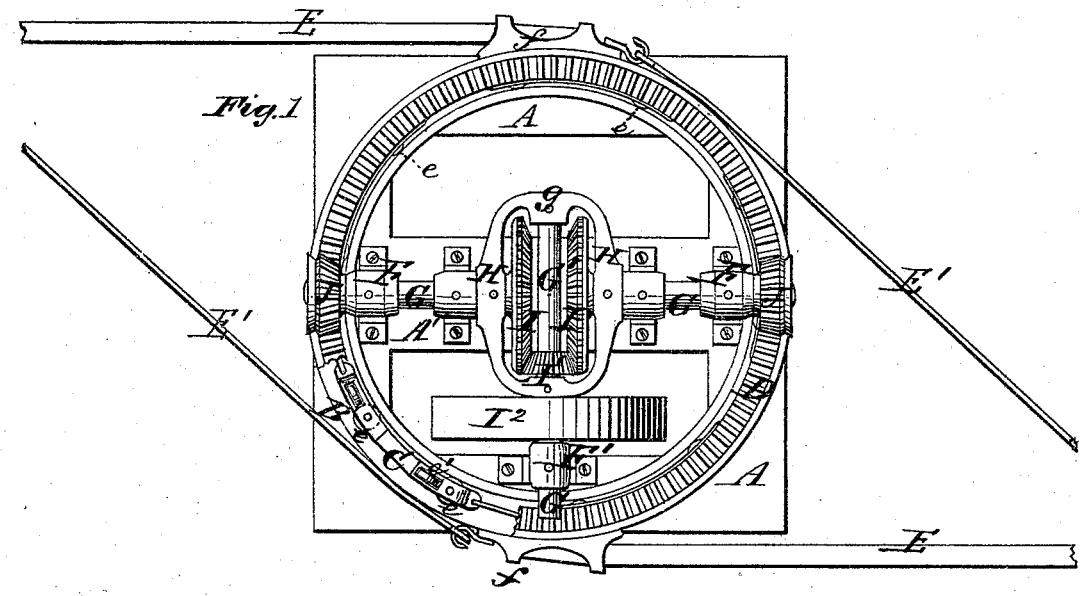
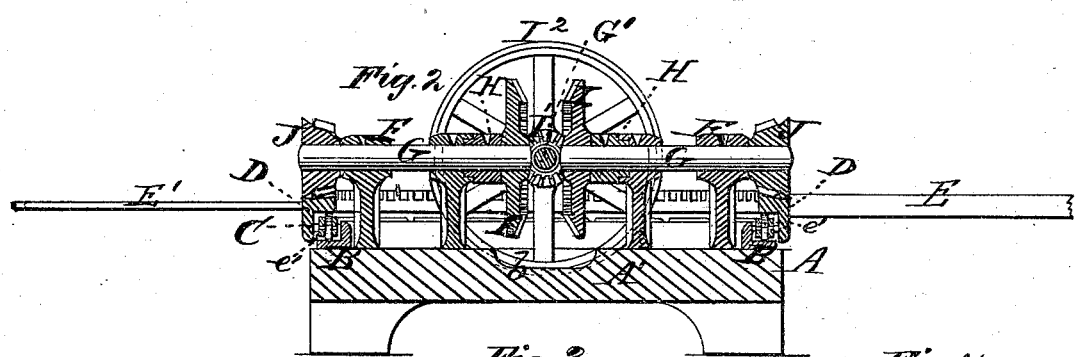
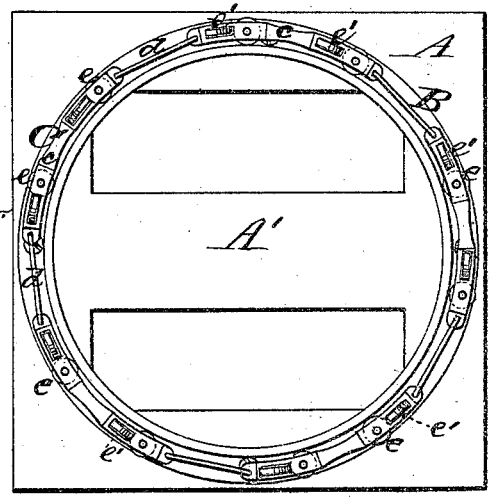
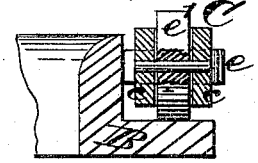
Witnesses:
James Martin Jr.
J. N. Campbell
Inventor:
Luther R. Faught
by
Mason, Fenwick & Lawrence 2 Sheets--Sheet 2.
L. R. FAUGHT.
Horse-Powers.
No. 143,974. Patented Oct. 28, 1873.
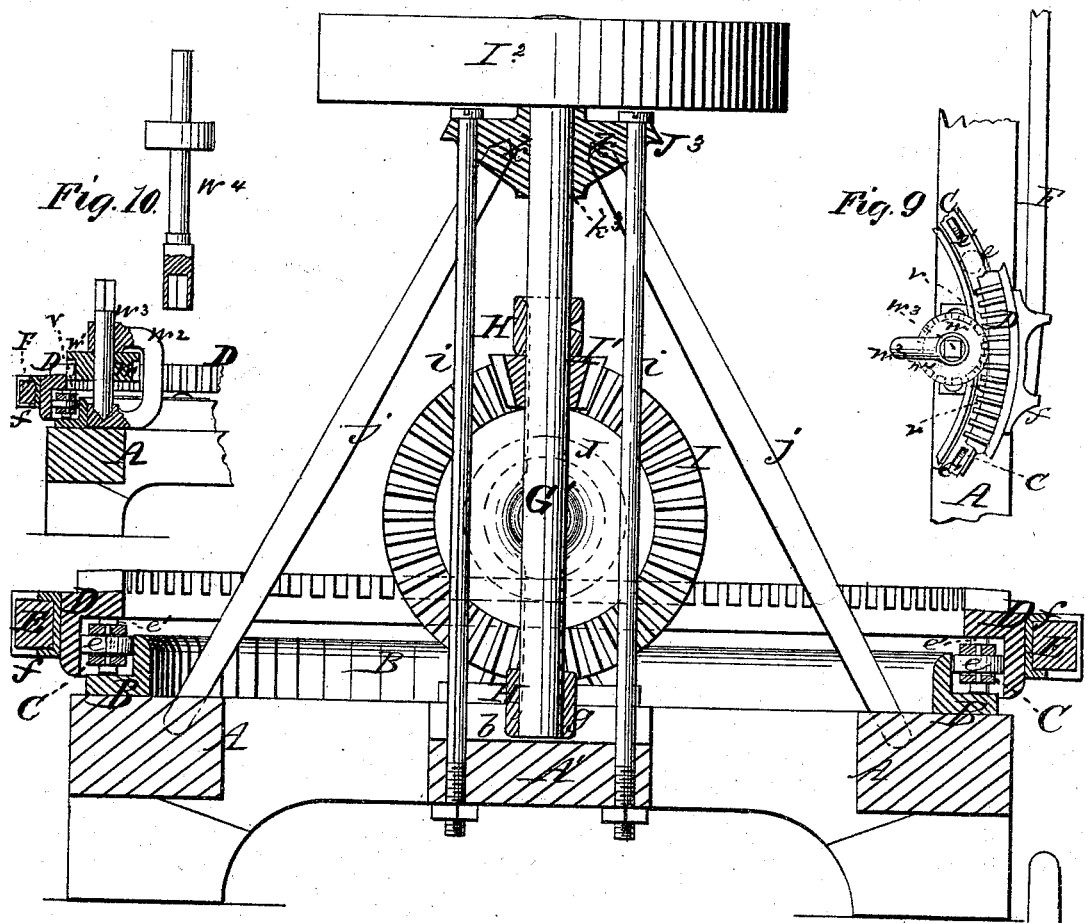
Witnesses.
James Martin Jr.
J. N. Campbell
Inventor.
Luther R. Faught
by
Mason, Fenwick & Lawrence

UNITED STATES PATENT OFFICE.

LUTHER R. FAUGHT, OF PHILADELPHIA, PENNSYLVANIA.

IMPROVEMENT IN HORSE-POWERS.

Specification forming part of Letters Patent No. 143,974, dated October 28, 1873; application filed October 3, 1873.

*To all whom it may concern:*

Be it known that I, LUTHER R. FAUGHT, of Philadelphia, in the county of Philadelphia and State of Pennsylvania, have invented a new and useful Improvement in Horse-Powers; and I do hereby declare that the following is a full, clear, and exact description thereof, reference being had to the accompanying drawings making part of this specification, in which—

Figure 1 is a plan or top view of my improved horse-power as adjusted for running a vertically-revolving belt upon its pulley, a portion of the circular ring-rack being broken away to show the construction of the anti-friction support upon which it revolves. Fig. 2 is a cross-section of the same in the line $x\,x$ of Fig. 1. Fig. 3 is a plan view of the anti-friction support, the base-ring thereof on the open horse-power platform, the other portions being removed to show more plainly said anti-friction support. Fig. 4 is an enlarged cross-section of the anti-friction support and its base-ring in the line $y\,y$ of Fig. 3. Fig. 5 is a cross-section of the horse-power adjusted for running a horizontal belt upon its driving-pulley. Figs. 6, 7, and 8 are details of the parts which are used to change the horse-power. Figs. 9 and 10 show a vertical section and top view of a slight modification of the ring-rack and pinion for transmitting the power.

Similar letters of reference indicate corresponding parts in the several figures.

My invention consists, first, in a horse-power ring-rack, with its draft-levers attached to its outer edge, in combination with an endless marginal traveling support which bears laterally and vertically between the rack and a base; second, in said endless traveling support, carrying horizontal and vertical trains of friction-wheels; third, in the combination, with the ring-rack and the gear-wheels and pulley-shaft, of a swinging bearing-yoke, a detached bearing and stay-block, stay-rods, and braces, whereby the pulley-shaft and pulley can be adjusted for running a horizontal driving-belt.

To enable others skilled in the art to make and use my invention, I will proceed to describe its construction and operation.

A represents a strong open timber platform, with a strong central cross-tree, A′, which latter is depressed, as at $b$, to admit the movements of the gearing for certain adjustments. B is a circular metal ring of L shape fastened firmly upon this platform. This ring presents a bottom and side bearing-surface. C is an endless chain of vertically and horizontally set friction-wheels. This chain is formed of segmental metal pieces $c\,c$ and straight sections $d\,d$, in form of a rod. The pieces and sections of rod are loosely linked together, so as to form a flexible endless chain. In the pieces $c\,c$ friction-wheels $e\,e'$ are secured by short turning shafts. The shafts of the wheels $e$ are vertical, and those of $e'$ horizontal. The wheels $e$ are set forward of the wheels $e'$, and both sets of wheels extend through and beyond the surfaces of the segmental pieces, as shown in Figs. 3 and 4. The endless chain thus formed is of a diameter to just pass down over the vertical flange of the ring B, and have its horizontal friction-wheels touch the said vertical flange. When this ring is in place the vertical friction-wheels also touch the horizontal flange of the ring B; and, therefore, it is completely isolated from the horizontal and vertical flanges of the ring B. D is the ring-rack, corresponding in form with the ring B, but set in a reverse position, so as to have its vertical flange touch the outside of the horizontal friction-wheels, and the under side of its horizontal flange touch the top of the vertical friction-wheels. On the horizontal flange of this ring the bevel-gear teeth which form the circular rack are cut, the length of these teeth being less than the width of said flange, in order to leave a narrow smooth surface on their outer ends for a similar smooth surface of the bevel-wheel which gears with the rack-teeth to run upon. On two sides of this ring-rack iron-socketed brackets $f\,f$, for holding the draft-levers E E and the stay-rods E² E², are fastened, as shown. F F F′, Figs. 1 and 2, are short bearing-standards, arranged within the ring-rack upon the timbers of the platform A. These standards are free from the ring-rack. G G G′ are short horizontal shafts, also arranged within the rack, and free from it. These shafts are boxed in the standards F F F′, and, also, are extended beyond these standards through a yoke, H, the shaft G' being longer than those G G, and having its foot or inner end sustained in a fourth box, $g$, of said yoke. This yoke is arranged to swing when the shaft G' is set free from its boxing F' for a purpose which will be presently described. On the ends of the shafts G G large bevel-wheels I I are arranged, and near the inner bearing-box of the yoke H a small bevel-wheel, I¹, is arranged, it being between the toothed surfaces of the wheels I I, and constructed to gear with the teeth of said wheels, as shown. On the outer ends of the shafts G G small bevel-wheels J J are arranged, and the same gear with the teeth of the ring-rack. These bevel-wheels are made with a plain surface beyond the outer ends of their teeth, and this surface runs upon the plain surface of the rack; and, as both of said plain surfaces stand out beyond the bases of the teeth, there will be a very easy movement between the rack and the bevel-pinion. On the outer end of the shaft G' the driving-pulley I² is fastened.

The horse-power described will run a horizontal belt by moving rack with the levers.

To make the horse-power available for running a vertical belt, I remove the standard-bearing F', and turn the yoke H up in a vertical position, as shown in Fig. 5, and substitute for the standard an upper bearing and stay piece, J³, which is bored through, as at $k^3$, Figs. 5, 6, and 7, and, after removing the pulley, pass the end of the shaft G through the same, and again replace the pulley. This bearing and stay piece I sustain in an elevated position by means of two vertical tension screw-rods, $i$ $i$, and four inclined braces, $j\,j$, which have their support upon the platform. The upper ends of the braces are set in sockets K K K K formed in the under side of the stay and bearing block, and the lower ends set in similar sockets formed in the side timbers of the platform A. The screw tension-rods pass through eyes K' K' of the stay-piece, and extend down through the central cross-tree of the platform, and receive nuts on their ends.

The rods and braces are all within the ring-rack, and free from contact with it. The horse-power thus constructed will run a vertical belt by moving the ring-rack with the levers.

In Figs. 9 and 10 of the drawings I have shown a spur-pinion, instead of a bevel-pinion, for transmitting the power from the rack.

It will be seen that the rack-ring in these views is toothed on its inner circumference at $v$, and that a spur-pinion, $w$, gears into the teeth thus formed. The teeth of the pinion $w$ are capped, as at $w^1$, and the capping flange so overhangs the teeth of the rack as to bear down upon and keep the rack to its place. The standard $w^2$ of the pinion-shaft $w^3$ is attached to one of the side timbers of the frame A, and is so shaped that it passes under the pinion-shaft and forms its steps, then outside and over the pinion $w$, and forms the upper bearing of the shaft, as shown in Fig. 10 of the drawings. The upper end of the shaft is square or polygonal, and a vertical pulley-shaft, $w^4$, may be coupled to it, as will be evident from the drawings. There may be two or more pinions $w$. If two are employed, the second one will be set on the opposite side of the rack. In all other respects the rack is constructed and supported as in the other figures of the drawings.

What I claim as my invention, and desire to secure by Letters Patent, is—

1. The horse-power ring-rack, with its draft-levers attached to its outer edge, in combination with the endless intermediate marginal traveling support C, which bears with rolling-surfaces both laterally and vertically between the rack D and the base B, substantially in the manner described.

2. The endless-chain support C, with its horizontal and vertical trains of rollers or wheels $e$ $e'$, substantially as described.

3. The swinging yoke H of the horse-power herein described, in combination with the bearing and stay piece J³, applied on removable supports of the platform A, within the ring-rack D, substantially as and for the purpose described.

LUTHER R. FAUGHT.

Witnesses:
J. N. CAMPBELL,
EDM. F. BROWN.